United States Patent [19]

Tollison

[11] Patent Number: 5,279,067
[45] Date of Patent: Jan. 18, 1994

[54] EASY TIE FISH HOOK OR THE LIKE

[76] Inventor: Bruce O. Tollison, 2283 Woodside Way, Chamblee, Ga. 30341

[21] Appl. No.: 739,251

[22] Filed: Aug. 1, 1991

[51] Int. Cl.⁵ .............................................. A01K 91/04
[52] U.S. Cl. .................................... 43/44.83; 289/1.5; 289/1.2
[58] Field of Search ............... 43/44.83; 289/1.2, 1.5, 289/16.5, 3, 4, 17

[56] References Cited

U.S. PATENT DOCUMENTS

| | | | |
|---|---|---|---|
| D. 33,775 | 12/1900 | Bower | 43/44.83 |
| 2,138,702 | 11/1938 | Litsey | 43/44.83 |
| 2,593,220 | 4/1952 | Thompson et al. | 43/44.83 |
| 2,645,840 | 7/1953 | Leary | 289/1.2 |
| 2,911,753 | 11/1959 | Beckett | 43/44.83 |
| 2,926,454 | 3/1960 | Gottman | 43/44.83 |
| 3,138,840 | 6/1964 | Rich | 43/42.49 |
| 4,092,796 | 6/1978 | Adams | 43/44.83 |
| 4,094,045 | 6/1978 | Stevenson | 43/44.83 |
| 4,503,634 | 3/1985 | Hamayasu | 43/44.83 |
| 5,009,025 | 4/1991 | Austad | 43/44.83 |

FOREIGN PATENT DOCUMENTS

| | | | |
|---|---|---|---|
| 2106151 | 8/1971 | Fed. Rep. of Germany | 43/43.16 |
| 1165445 | 10/1969 | United Kingdom | 43/44.83 |
| 1378454 | 12/1974 | United Kingdom | 289/1.2 |
| 2030032 | 4/1980 | United Kingdom | 43/44.83 |

*Primary Examiner*—Richard K. Seidel
*Assistant Examiner*—Jeanne M. Elpel
*Attorney, Agent, or Firm*—Harry I. Leon

[57] ABSTRACT

A method of attaching a line to a hooked item such as a fishing hook, plug, gig, lure or spoon. Each hooked item includes an elongated shank and an open-ended slot disposed contiguous with one end of the shank. Formed when the material from which the shank is fabricated is bent back upon itself, the slot is tapered, having a slight divergence toward the open end of the slot. For a particular slot, a line having a transverse cross-section with a radius approximately equal to the radius of curvature of the closed end of the slot is employed; but because of the tapered slot, each slot size can be used with a wide range of line sizes. To attach the line to the hooked item, one simply places an end of the line through the slot, runs a portion of the line past the slot along the shank, wraps the line extending beyond this portion around it and the shank, and finally pulls the free end of the line into the slot and towards the closed end thereof of the slot. When the line is so pulled, it entwines upon itself, bunches and wedges into the slot. The resultant tie becomes stronger as load is applied to the line. Repeated tests have shown that the line will break before this knot becomes dislodged.

3 Claims, 2 Drawing Sheets

EASY TIE FISH HOOK OR THE LIKE

BACKGROUND OF THE INVENTION

Tying fine lines to fish hooks presents may problems. The use of such lines makes knot tying difficult even under good conditions. With wet and/or cold hands, the problem is greatly magnified. Because of the popularity of fishing, much interest has been directed towards finding ways of simplifying the attachment of lines to fish hooks.

One of the earliest patents teaching a simplified method of attaching a line to a fish hook was issued to Hiltz, U.S. Pat. No. 86,154, in 1869. Hiltz discloses a fish hook with a hole and a slot which communicate with each other. For use with this hook, a preformed knot, which is substantially larger than the width of the slot, is slipped through the hole; and the line is pulled into the slot, so that the knot extends outwardly from one side and the line from the other side.

Subsequently, Adams and later Fry improved upon Hiltz' combination. Adams, in U.S. Pat. No. 4,092,796 issued in 1978, discloses a fish hook with an open-ended slot for receiving a line with a preformed knot. Fry, in U.S. Pat. No. 4,535,562 issued in 1985, teaches a fish hook having a large, open-ended slot which communicates with a narrower slot.

Another invention which is an integral part of a fish hook or lure and is designed to facilitate knot tying is disclosed in U.S. Pat. No. 3,848,345, issued to Austad et al. in 1974. Their quick tie device comprises a double loop in which two loops are disposed generally perpendicularly to and proximate with each other. With these loops, a user can attach a line to the hook or lure by wrapping the line first about one loop and then about the other.

Similarly, Manno, in U.S. Pat. No. 4,905,403 issued in 1990, discloses a hook with double loops arranged side-by-side but with open portions of these loops facing in opposite directions. A fish line can be attached to this hook by doubling the line back upon itself and passing the closed end of the line over the loop closest to the hook so as to hold this closed end in place. The remainder of the line that is doubled back on itself is then wrapped repeatedly about a portion of the hook disposed between the double loops before being pulled through the other open-ended loop, thereby completing the attachment of the line to the hook.

Accessories have also been employed to facilitate tying lines to fish hooks, as disclosed in U.S. Pat. No. 3,675,276 issued to Nuse in 1972 and in U.S. Pat. No. 3,913,185 issued to James in 1975. Nuse's device is a flat sheet member interposed between the primary fish line and a leader for the hook. The leader for the hook is, however, tied with a conventional knot. James' accessory is a clip which can be threaded through the eye of a fish hook; but once the eye is so threaded, the line is slipped through an opening in the clip and tied—again in a conventional manner.

SUMMARY OF THE INVENTION

According to the present invention, there is provided a device with a working end such as a hook, a structure for retaining line and an elongated shaft extending, between the line retaining structure and the working end. In the preferred embodiment, the line-retaining structure has a closed end from which side portions extend, the closed end and side portions defining a narrow, open-ended slot for ready attachment of a line to a fish hook or the like. The longitudinal centerline of the slot is disposed generally parallel to the direction of any forces which are likely to act on the line when the U-shaped structure is in use. Diverging slightly from each other in the direction away from the closed end, the side portions are preferably fabricated from a single unitary piece such as an elongated shaft which is bent back upon itself. When the elongated shaft is an integral part of a fish hook, the closed end of the slot is disposed distal from the hook. This closed end has an inner wall with a radius of curvature which is approximately the same width as the radius of the line to be used. The line-retaining structure has applicability not only to the design of fish hooks, spinners, lures, plugs and/or other fishing devices but also to components in general which must be attached easily and securely to a line.

To attach a line to the line-retaining structure, all that is required is to place one end of the line through the slot; hold a portion of the line past the slot along the shank; while so holding the line, wrap the rest of the line around the shank between the held portion of the shank and the slot several times; and then pull the user's end of the line toward the slot into the open-end of the slot and toward the closed end thereof until the loops formed in the line are bunched together in the slot. When the line is pulled into the slot, the loops intertwine with each other forming a bundle that wedges against the inner walls of the U-shaped structure. The intertwining is as effective as a knot in attaching a line to the line-retaining structure since the harder the user pulls his side of the line against the slot side portions and/or closed end the more the bundle of loops wedges itself within the slot. During tests of a phototype, the line has consistently broken and has never been pulled out of the slot.

BRIEF DESCRIPTION OF THE DRAWINGS

FIG. 4 is a perspective view of a second embodiment of an exemplary structure according to the present invention.

DESCRIPTION OF THE PREFERRED EMBODIMENTS

Figure 1:
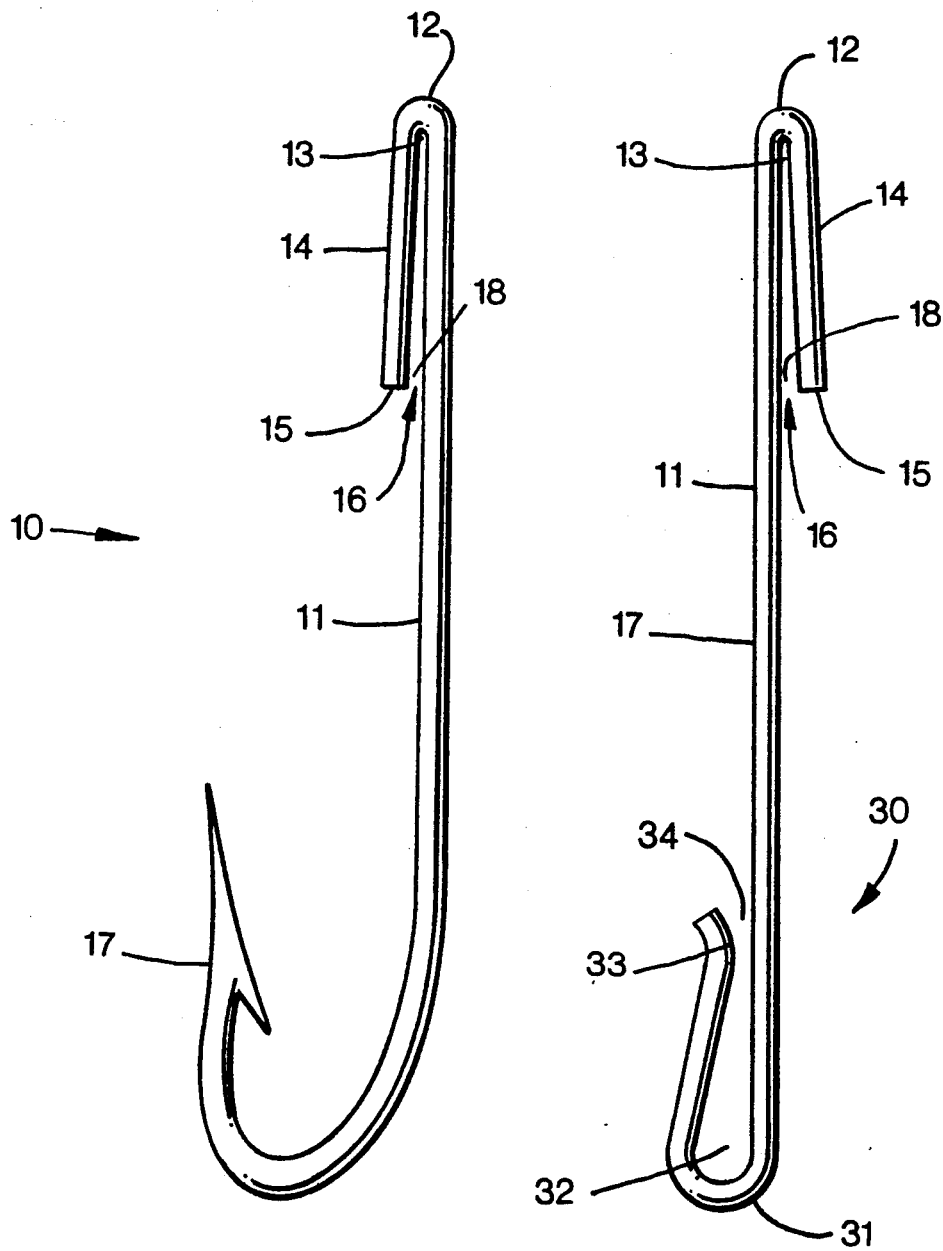
FIG. 1 is a perspective view, on an enlarged scale, of a first embodiment of an exemplary structure according to the present invention.

Referring to the drawings, there is shown a line-retaining structure according to the present invention incorporated into a fish hook, the resultant hooked item being indicated generally by the reference numeral 10. The U-shaped structure itself comprises an extension of an elongated shank 11 and a side portion 14 disposed generally parallel thereto which form a narrow, open-ended slot 16. Preferably, the side portion 14 and the shank 11 are from a single shank, which prior to its being bent back upon itself to form the slot 16, terminated at the end 15.

The slot 16 has its minimum width 13 at the closed end 12 and diverges slightly in the direction of the open end 18 of the slot. In the preferred embodiment, the side 14 of the slot 16 measures, by way of example, about ½ inch long. The width of the slot 16 determines the size of the line 20 which can be used in a particular line-retaining structure. However, due to length and taper of the slot 16, lines having a wide range of line sizes can be utilized with each slot. For example, two different sizes of slots have been found to be adequate to accommodate nylon lines meeting the specifications given in Table I below. In Table I, slot size A refers to a slot 16 which has a minimum width of 0.012 inch (corresponding to twice the radius of curvature of the closed end 13) and a maximum width of 0.025 inch at the open end 18; slot size B refers to a slot 16 with a minimum width of 0.022 inch (corresponding to twice the radius of curvature of the closed end 13) and a maximum width of 0.050 inch at the open end 18.

TABLE I

| Line Strength, pounds | Diameter of Line, inches | Slot Size |
| --- | --- | --- |
| 2 | 0.005 | A |
| 4 | 0.008 | A |
| 6 | 0.010 | A |
| 8 | 0.011 | A |
| 10 | 0.012 | A |
| 12 | 0.013 | A |
| 14 | 0.014 | A |
| 15 | 0.014 | A |
| 17 | 0.016 | A |
| 20 | 0.018 | A |
| 30 | 0.022 | A |
| 40 | 0.024 | A |
| 50 | 0.029 | B |
| 80 | 0.037 | B |
| 125 | 0.046 | B |

An alternate embodiment incorporating the line-retaining structure according to the present invention is shown in FIG. 4. This embodiment differs from the hooked item 10 in that a shank 11 is fixedly attached to a clip 30. The clip 30, which is fabricated from a metal or similar material with linear spring properties, includes a curved portion which defines an eye 32 and a neck 33. The neck 33 is disposed between the eye 32 and an inlet 34 and communicates with both. The maximum width of the eye 32 is substantially greater than the minimum width of the neck 33. In use, the end of the clip 30 proximate with the inlet 34 can be slipped through the eye of a fish hook, lure or other standard fishing items, securing it to the U-shaped structure.

Figure 2:
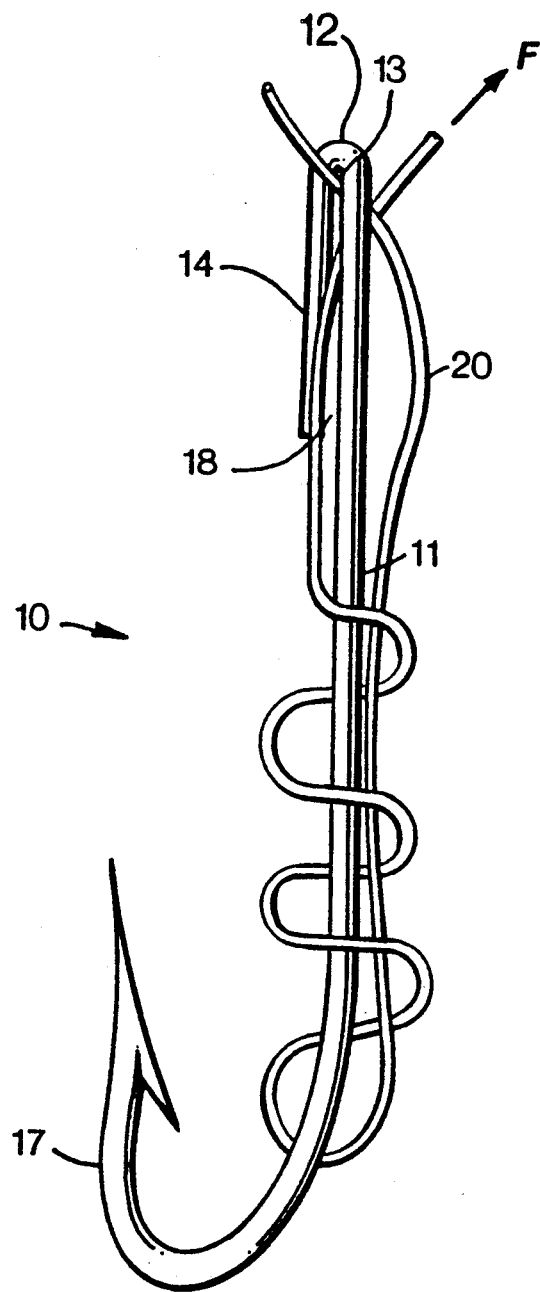
FIG. 2 is a perspective view of the structure according to FIG. 1, showing the wrapping of the line about the structure in preparation for the free end of the line being pulled to the closed end of the slot.
Figure 3:
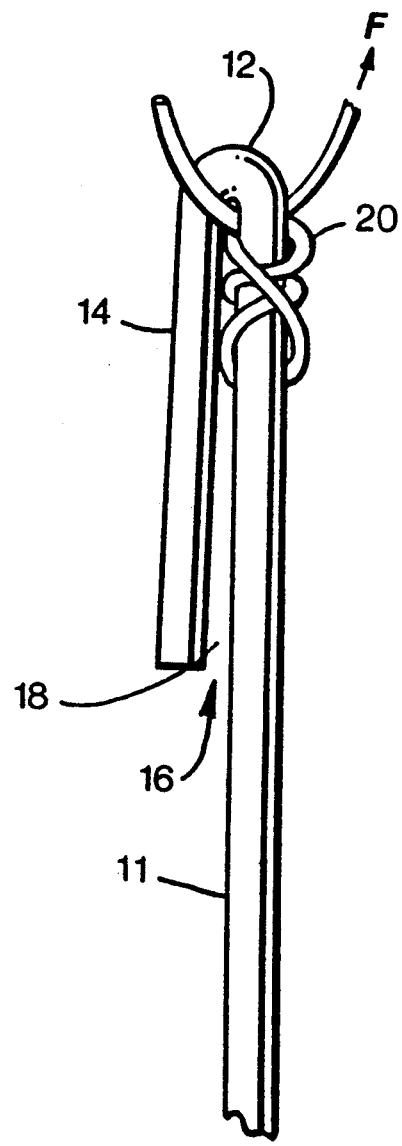
FIG. 3 is a further enlarged view of a fragmentary portion of the structure according to FIG. 1 connected to a line.

The method of attaching a fine line 20 to the line-retaining structure according to the present invention is described herein with particular reference to FIG. 2. With the short end of the line 20 extending through the slot 16, the line is held against the shank 11 between the hook 17 and the open end 18 of the slot. Still holding the line 20 on the shank 11, the user loops the line 20 about three or four times around the shank 11 and the line as shown in FIG. 2. Applying a tension force F to the line 20, he then pulls the line and its loops into the open end 18 of the slot 16 and toward the closed end 12 thereof causing the loops to bunch together in the slot 16 as shown in FIG. 3. Experience has shown that the harder the pull on the line 20 the more the entwined loops tend to wedge into the slot 16. For all lines tested to date, the line has broken in tension before it became detached from the line-retaining structure.

It is nearly as simple to undo the attachment of the line 20 to the line-retaining structure as it is to attach it in the first place. The user with the tips of his finger and fingernails slides the knot-like entwinement of the line 20 out of the slot 16. Thereupon, the line 20 becomes loose and can be unwrapped from the shank 11.

It is apparent from the foregoing that a new and improved apparatus for tying lines to fish hooks or the like has been provided. While only the presently preferred embodiment of the invention has been disclosed, as will be apparent to those familiar with the art, certain changes and modifications can be made without departing from the scope of the invention as defined by the following claims.

What is claimed is:

1. A method of attaching line to a line-retaining structure defining an elongated, open-ended slot, a shank extending from the line-retaining structure from points thereon proximate with the open end of the slot, comprising the steps of:
   (a) inserting an end of the line into the slot through the open end of the slot;
   (b) holding a first portion of the line proximate with the end against the shank;
   (c) wrapping a second portion of the line disposed proximate with said first portion simultaneously about the shank and the first portion while retaining said end in the slot; and
   (d) pulling a third portion of the line situated proximate with said second portion into the slot through the open end of the slot until the second portion is brought into operative association with the line-retaining structure, said end and the first, second, and third portions of the line being disposed in linear succession along the line.

2. The method according to claim 1 wherein the line-retaining structure defines an elongated slot which extends longitudinally generally parallel to the direction of the line when the line is being pulled, the slot having a closed end disposed distal from the shank, the closed end having an inner wall with a radius of curvature which is approximately equal to the radius of a transverse cross-section of the line.

3. The method according to claim 2 wherein the slot is further characterized as having a slight taper, the slot decreasing in width from the open end of the slot to the closed end thereof, so that line belonging to a substantial range of line sizes can be used with the device.

* * * * *